(12) United States Patent
Bao et al.

(10) Patent No.: US 12,656,643 B2
(45) Date of Patent: Jun. 16, 2026

(54) SNAP-FIT PLASMA DISPLAY MODULE AND PLASMA DISPLAY

(71) Applicant: WUXI VISION PEAK TECHNOLOGY CO., LTD, Wuxi (CN)

(72) Inventors: Jin Bao, Wuxi (CN); Shan Chen, Wuxi (CN); Zhenxing Tang, Wuxi (CN); Jun Xu, Wuxi (CN)

(73) Assignee: WUXI VISION PEAK TECHNOLOGY CO., LTD, Wuxi (CN)

(*) Notice: Subject to any disclaimer, the term of this patent is extended or adjusted under 35 U.S.C. 154(b) by 183 days.

(21) Appl. No.: 18/699,308

(22) PCT Filed: Apr. 15, 2022

(86) PCT No.: PCT/CN2022/086996
§ 371 (c)(1),
(2) Date: Apr. 8, 2024

(87) PCT Pub. No.: WO2023/197286
PCT Pub. Date: Oct. 19, 2023

(65) Prior Publication Data
US 2025/0237909 A1 Jul. 24, 2025

(30) Foreign Application Priority Data

Apr. 11, 2022 (CN) ........................ 202210372023.X

(51) Int. Cl.
| | |
|---|---|
| *G02F 1/1339* | (2006.01) |
| *G02F 1/1335* | (2006.01) |
| *G02F 1/1676* | (2019.01) |

(52) U.S. Cl.
CPC .... *G02F 1/13394* (2013.01); *G02F 1/133514* (2013.01); *G02F 1/13392* (2013.01); *G02F 1/1676* (2019.01); *G02F 2201/465* (2013.01)

(58) Field of Classification Search
CPC ........... G02F 1/13394; G02F 1/133514; G02F 1/13392; G02F 1/1676
See application file for complete search history.

(56) References Cited

U.S. PATENT DOCUMENTS

| | | |
|---|---|---|
| 10,509,242 B2 | 12/2019 | O'Keeffe |
| 2006/0008713 A1 | 1/2006 | Toyoda |

(Continued)

FOREIGN PATENT DOCUMENTS

| | | |
|---|---|---|
| CN | 101118361 A | 2/2008 |
| CN | 101118361 B | 9/2011 |

(Continued)

OTHER PUBLICATIONS

Bao et al. CN114253025A, machine translation—Mar. 2022 (Year: 2022).*

(Continued)

*Primary Examiner* — Tracie Y Green
(74) *Attorney, Agent, or Firm* — Bayramoglu Law Offices LLC

(57) ABSTRACT

A snap-fit plasma display module includes a first substrate and a second substrate. A plasma display cavity is formed between the first substrate and the second substrate, and the plasma display cavity is filled with plasma particles. A surface of the first substrate is provided with a filter layer, and a surface of the second substrate facing the first substrate is provided with a pixel electrode layer. A plasma isolation structure extending toward the first substrate is arranged on the pixel electrode layer, a surface of the filter layer facing the second substrate is provided with a snap-fit structure, the (Continued)

snap-fit structure is adapted to the plasma isolation structure to fix the first substrate and the second substrate, and each of the surface of the filter layer facing the second substrate and a surface of the snap-fit structure facing the second substrate is provided with a conductive dielectric layer.

16 Claims, 8 Drawing Sheets

(56) References Cited

U.S. PATENT DOCUMENTS

| 2008/0024432 A1* | 1/2008 | Lee | G02F 1/167 |
| | | | 345/107 |
| 2023/0359099 A1* | 11/2023 | Lo | G02F 1/167 |

FOREIGN PATENT DOCUMENTS

| CN | 106646974 | A | | 5/2017 | | |
| CN | 106997749 | A | | 8/2017 | | |
| CN | 206380170 | U | | 8/2017 | | |
| CN | 110850658 | A | | 2/2020 | | |
| CN | 111025815 | A | | 4/2020 | | |
| CN | 111736402 | A | * | 10/2020 | ........ | G02F 1/16757 |
| CN | 212364769 | U | * | 1/2021 | | |
| CN | 215526314 | U | | 1/2022 | | |
| CN | 114253025 | A | * | 3/2022 | ........ | G02F 1/13392 |
| JP | 2007103053 | A | | 4/2007 | | |
| JP | 2017049552 | A | | 3/2017 | | |
| KR | 20080040203 | A | | 5/2008 | | |
| KR | 20120131611 | A | | 12/2012 | | |
| KR | 20190089147 | A | | 7/2019 | | |
| WO | 2011155410 | A1 | | 12/2011 | | |
| WO | 2022027580 | A1 | | 2/2022 | | |

OTHER PUBLICATIONS

Chen et al., CN 212364769 U, machine translation, Jan. 2021 (Year: 2021).*

Xu et al., CN 111736402, machine translation ,Feb. 2020 (Year: 2020).*

* cited by examiner

160

160

160

160

160

SNAP-FIT PLASMA DISPLAY MODULE AND PLASMA DISPLAY

CROSS REFERENCE TO THE RELATED APPLICATIONS

This application is the national phase entry of International Application No. PCT/CN2022/086996, filed on Apr. 15, 2022, which is based upon and claims priority to Chinese Patent Application No. 202210372023.X, filed on Apr. 11, 2022, the entire contents of which are incorporated herein by reference.

TECHNICAL FIELD

The present disclosure relates to the technical field of electronic display, and in particular, to a snap-fit plasma display module and a plasma display.

BACKGROUND

An existing plasma display structure is mainly formed by a glass substrate, and a filter, an indium tin oxide (ITO) layer and a plasma barrier weir that are sequentially formed on the glass substrate. A gap is reserved between the plasma barrier weir and the ITO layer to form a plasma flow port, and an upper cover plate and a lower cover plate are prone to deformation caused by an external force, such that the display has poor pressure resistance. Therefore, increasing the overall structural strength of the display, reducing deformation of the upper cover plate and the lower cover plate, and improving overall pressure resistance of the display have become urgent technical problems to be solved by those skilled in the art.

SUMMARY

The present disclosure provides a snap-fit plasma display module and a plasma display, which solve the problem of low overall pressure resistance of a plasma display in the prior art.

A technical solution of the present disclosure provides a snap-fit plasma display module, including a first substrate and a second substrate arranged opposite thereto, where a plasma display cavity is formed between the first substrate and the second substrate, and the plasma display cavity is filled with plasma particles;

a surface of the first substrate is provided with a filter layer, and a surface of the second substrate facing the first substrate is provided with a pixel electrode layer; and a plasma isolation structure extending toward the first substrate is arranged on the pixel electrode layer, a surface of the filter layer facing the second substrate is provided with a snap-fit structure, a shape of the snap-fit structure is adapted to a shape of the plasma isolation structure to fix the first substrate and the second substrate, and each of the surface of the filter layer facing the second substrate and a surface of the snap-fit structure facing the second substrate is provided with a conductive dielectric layer.

Further, an end of the snap-fit structure facing the second substrate is provided with a clamping groove, and an end of the plasma isolation structure facing the first substrate is embedded in the clamping groove.

Further, the filter layer includes a plurality of color filters spaced apart.

Further, a filling medium is arranged between every two adjacent color filters, and the snap-fit structure is arranged on a surface of the filling medium.

Further, the filling medium is made of a resin.

Further, a supporting structure is arranged in a plasma-filled region.

Further, the supporting structure includes a supporting microsphere, and the supporting microsphere is tangent to the conductive dielectric layer and the pixel electrode layer, respectively.

Further, the plasma particles include white particles and black particles.

Further, the pixel electrode layer includes a plurality of pixel electrodes distributed in an array, a gap is formed between two adjacent pixel electrodes, and the plasma isolation structure covers the gap.

Further, a cross-sectional shape of the plasma isolation structure includes a trapezoid.

Another technical solution of the present disclosure provides a plasma display, including the snap-fit plasma display module according to any of the implementations described above.

The present disclosure has following beneficial effects: in the plasma display module according to the present disclosure, a transparent resin layer is provided in a gap between color filters of filters, such that an upper substrate has a flat surface, and then a plasma isolation structure is wrapped by a snap-fit structure. This can increase an overall structural strength of the display, reduce movement of plasma, and reduce deformation of the upper cover plate and a lower cover plate caused by an external force, thereby improving overall pressure resistance.

DETAILED DESCRIPTION OF THE EMBODIMENTS

To enable those skilled in the art to better understand the solutions in the present disclosure, the technical solutions in the embodiments of the present disclosure are clearly and completely described below with reference to the accompanying drawings in the embodiments of the present disclosure. The described embodiments are merely some, rather than all, of the embodiments of the present disclosure. All other embodiments obtained by those of ordinary skill in the art based on the embodiments of the present disclosure without creative efforts shall fall within the protection scope of the present disclosure.

Figure 1:
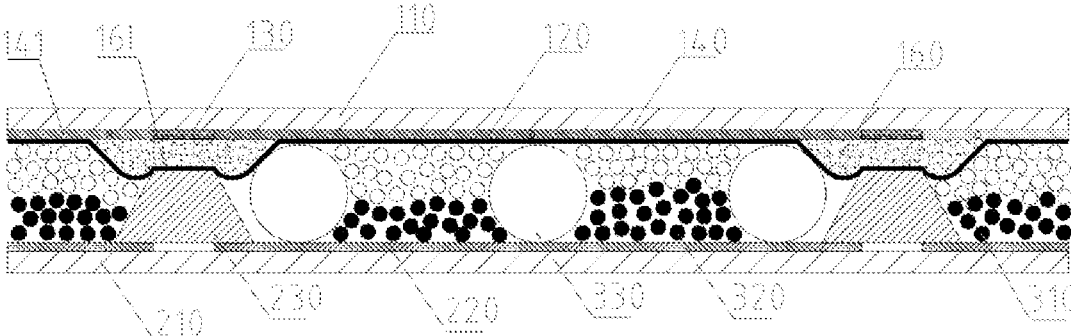
FIG. 1 is a sectional view of a plasma display module according to the present disclosure.
Figure 2:
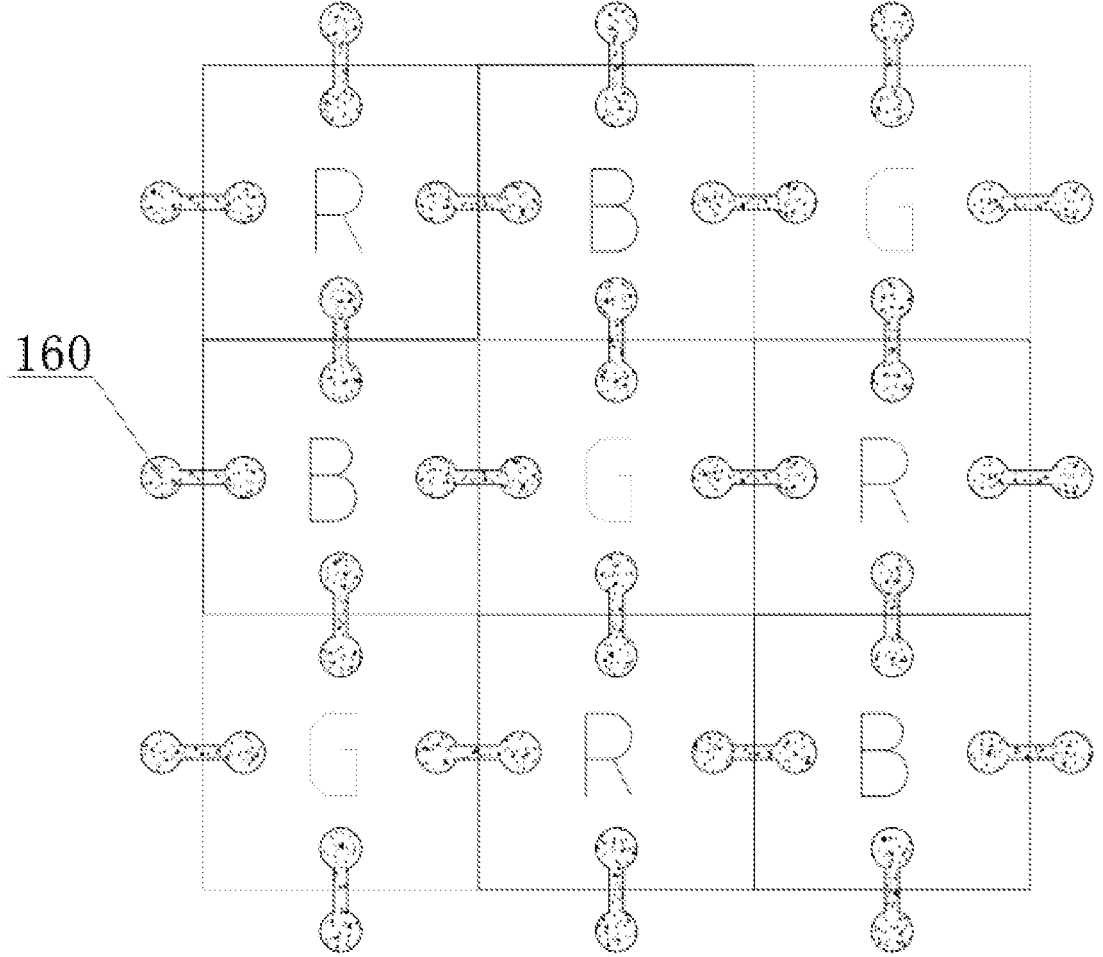
FIG. 2 is a first schematic diagram illustrating an arrangement of snap-fit structures of a plasma display module according to the present disclosure.
Figure 3:
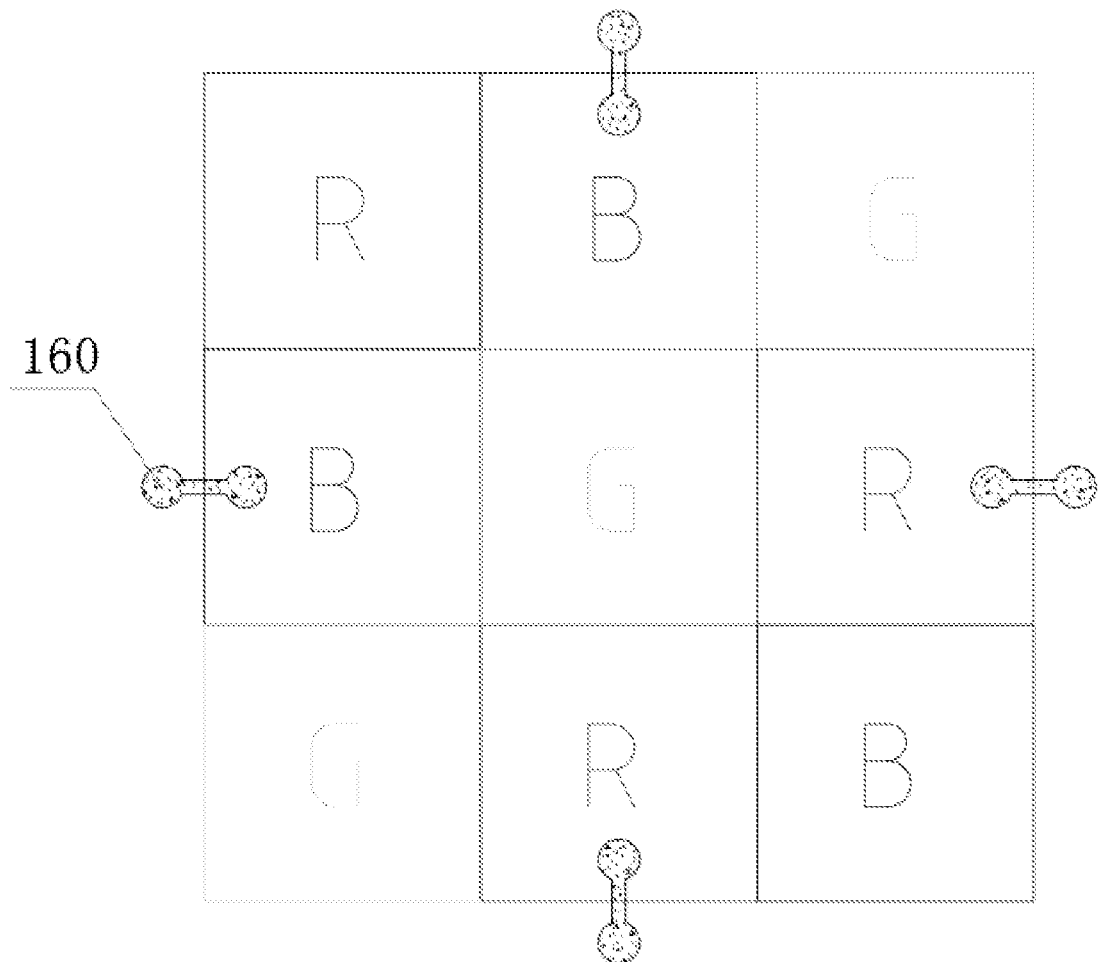
FIG. 3 is a second schematic diagram illustrating an arrangement of snap-fit structures of a plasma display module according to the present disclosure.
Figure 4:
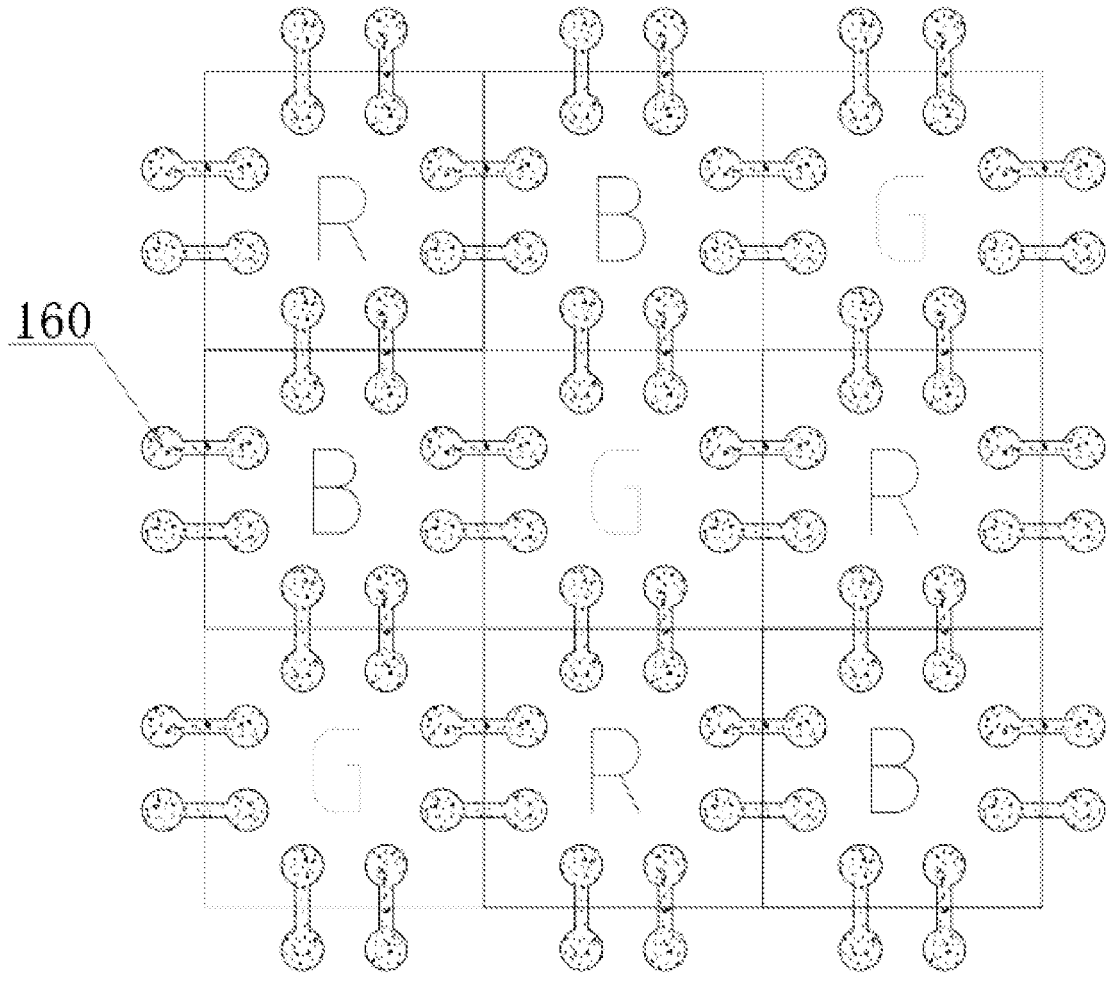
FIG. 4 is a third schematic diagram illustrating an arrangement of snap-fit structures of a plasma display module according to the present disclosure.
Figure 5:
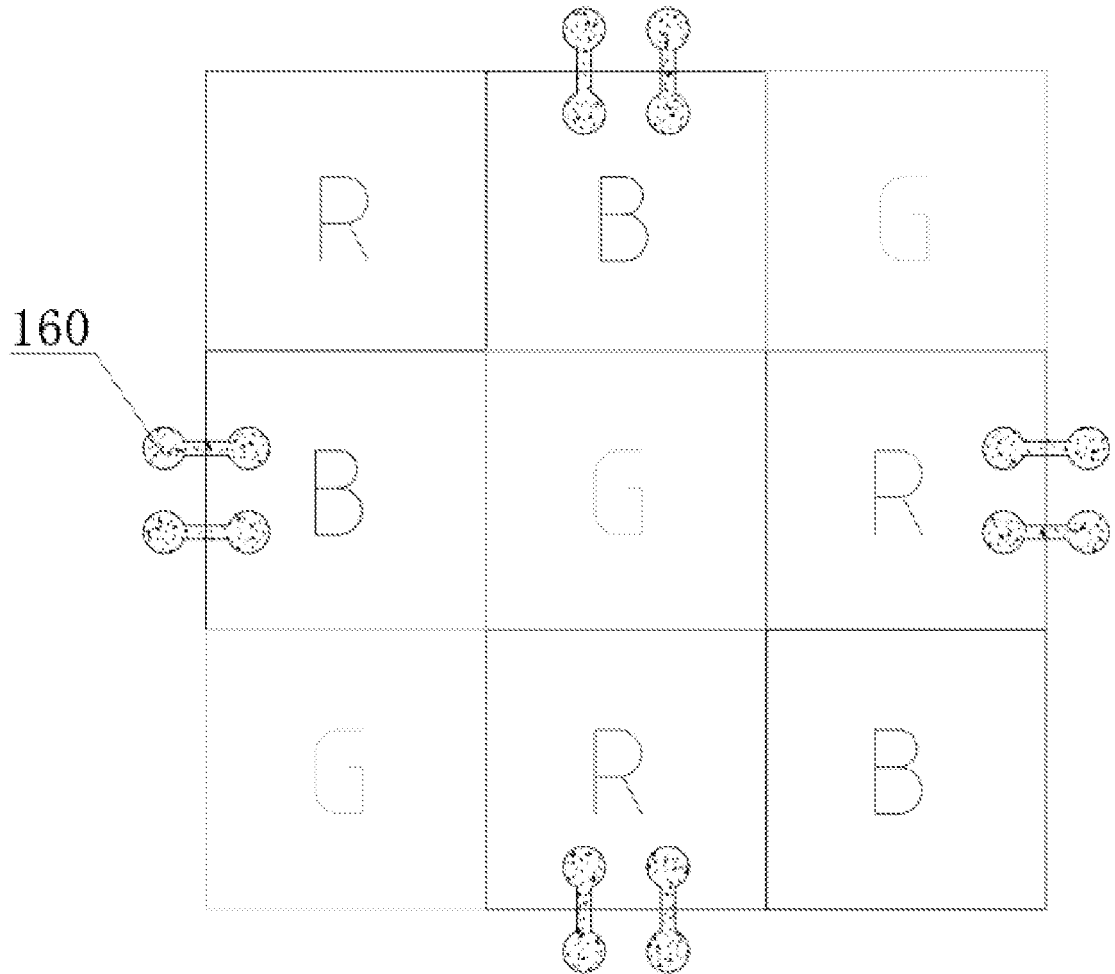
FIG. 5 is a fourth schematic diagram illustrating an arrangement of snap-fit structures of a plasma display module according to the present disclosure.
Figure 6:
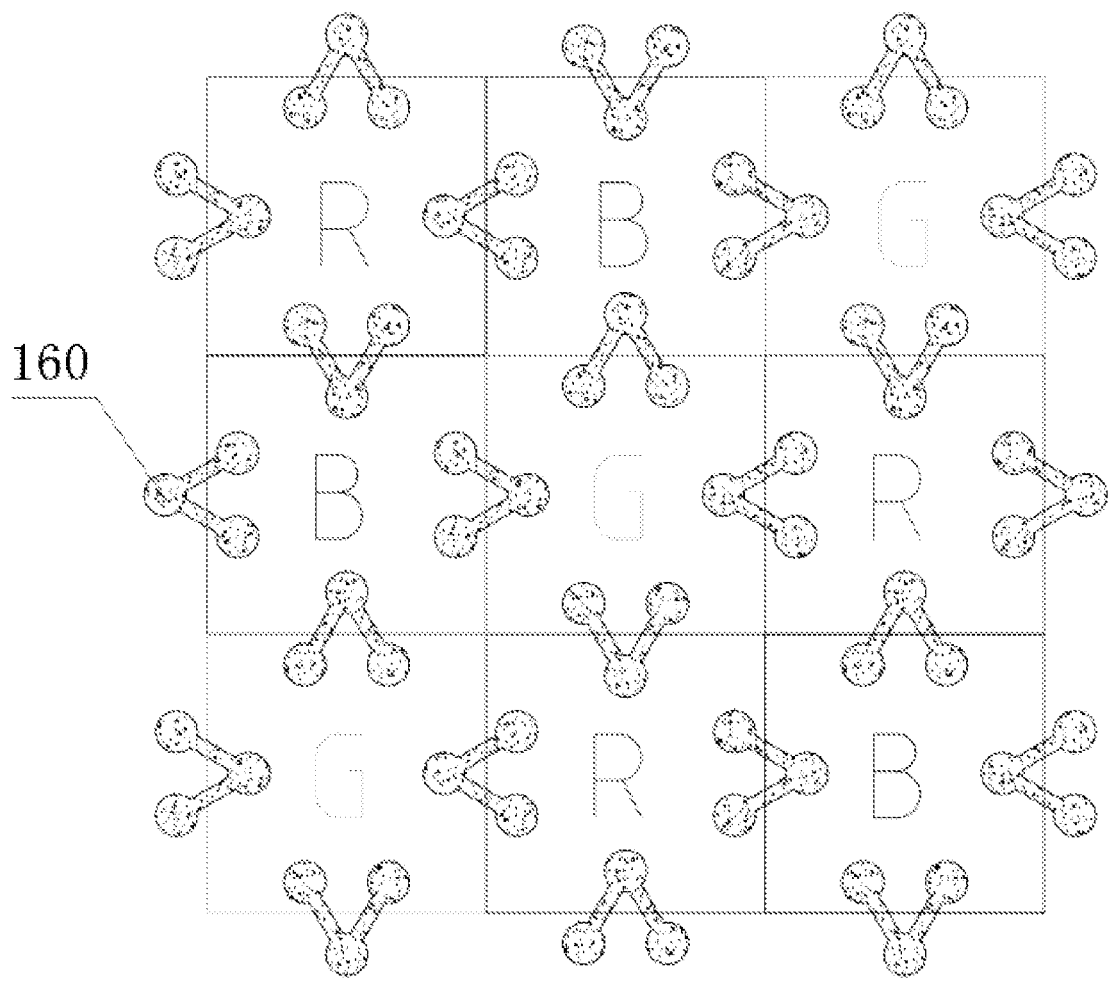
FIG. 6 is a first schematic diagram illustrating a style of snap-fit structures of a plasma display module according to the present disclosure.
Figure 7:
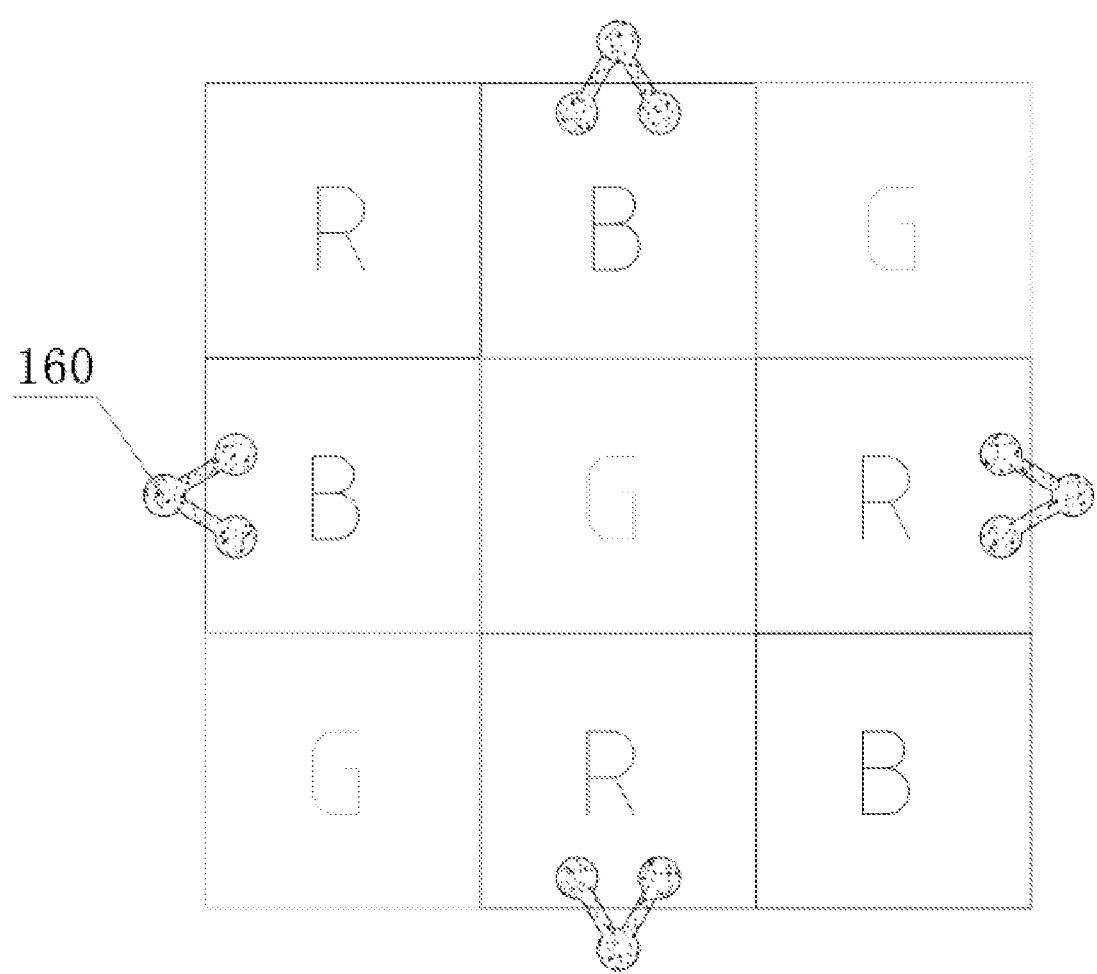
FIG. 7 is a second schematic diagram illustrating a style of snap-fit structures of a plasma display module according to the present disclosure.
Figure 8:
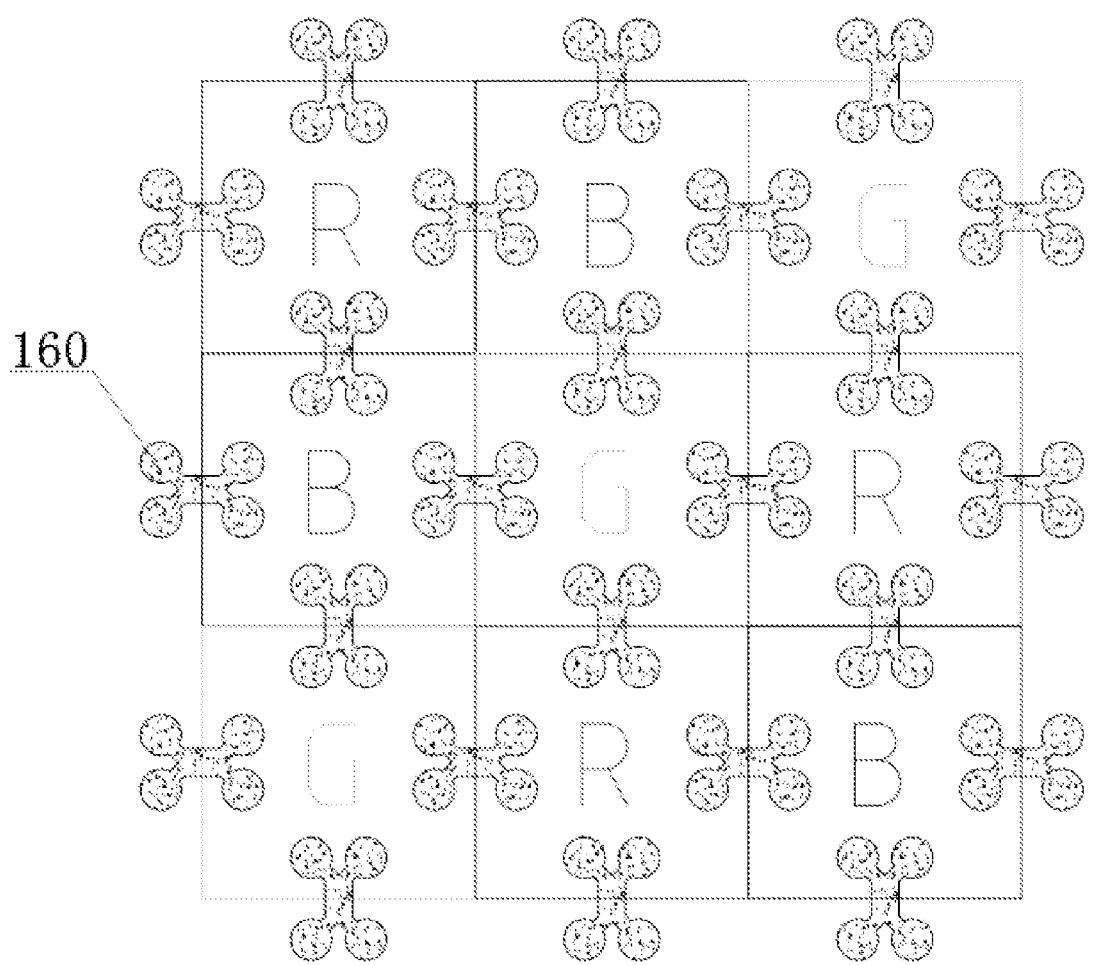
FIG. 8 is a third schematic diagram illustrating a style of snap-fit structures of a plasma display module according to the present disclosure.
Figure 9:
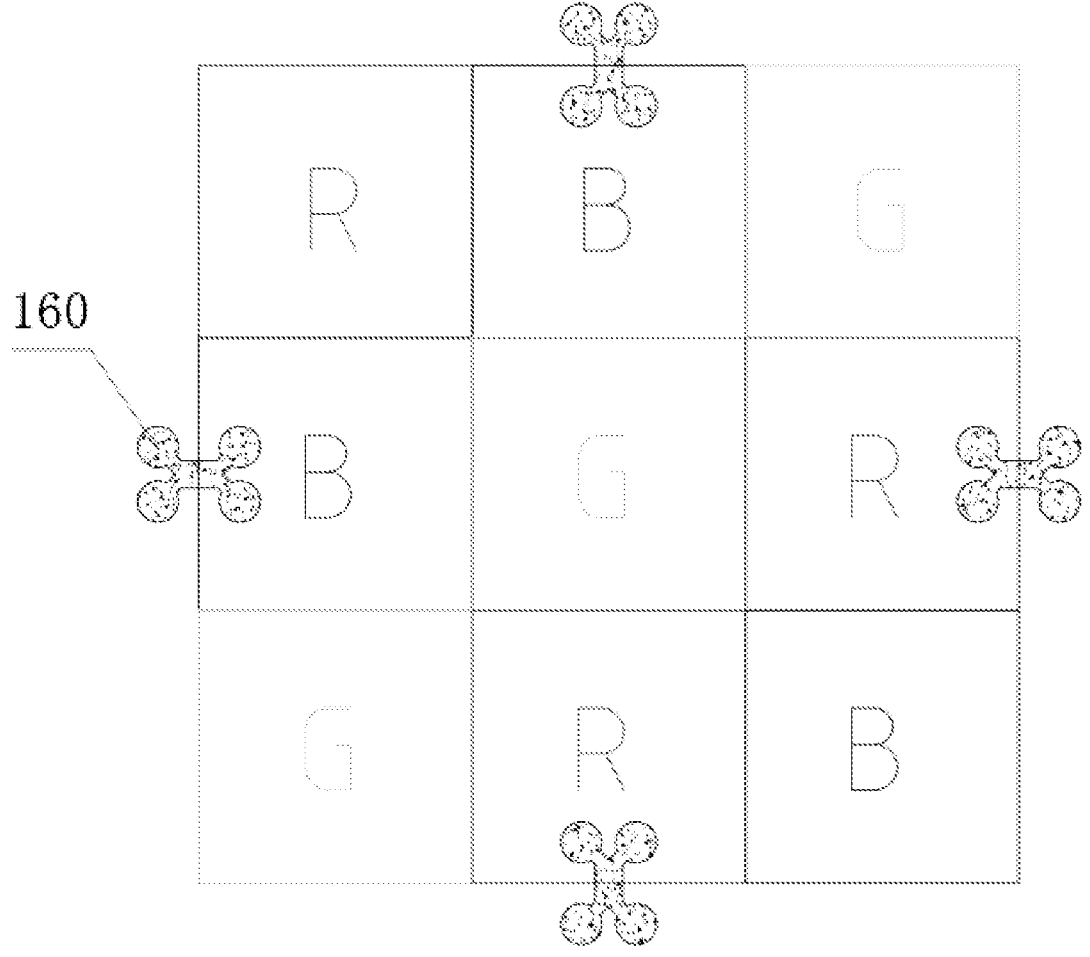
FIG. 9 is a fourth schematic diagram illustrating a style of snap-fit structures of a plasma display module according to the present disclosure.

In an embodiment of the present disclosure, FIG. 1 is a structural sectional view of a snap-fit plasma display module according to the present disclosure. As shown in FIG. 1, the snap-fit plasma display module according to the present disclosure includes first substrate 110 and second substrate 210 arranged opposite thereto. A plasma display cavity is formed between the first substrate 110 and the second substrate 210, and the plasma display cavity is filled with plasma particles. The plasma particles include white particle 310 and black particle 320. As shown in FIG. 1, dark particles are plasma black particles, and light particles are plasma white particles. It should be understood that the plasma particles 320 may further include two-color, three-color or multi-color pigment particles, which may be selected as required, and are not limited herein.

Glass substrates may be used as the first substrate and the second substrate, and a thin film transistor (TFT) glass substrate may be used as the second substrate.

The first substrate 110 is provided with filter layer 120, and the filter layer 120 may be arranged on a surface of the first substrate 110 facing the second substrate 210, or may be arranged on a surface of the first substrate 110 facing away from the second substrate 210, and a surface of the second substrate 210 facing the first substrate 110 is provided with pixel electrode layer 220.

Plasma isolation structure 230 extending toward the first substrate 110 is arranged on the pixel electrode layer 220, and a surface of the filter layer 120 facing the second substrate 210 is provided with snap-fit structure 160. A shape of the snap-fit structure 160 is adapted to a shape of the plasma isolation structure 230 to fix the first substrate 110 and the second substrate 210. The snap-fit structure 160 may be arranged as follows: An end of the snap-fit structure 160 facing the second substrate 210 is provided with clamping groove 161, an end of the plasma isolation structure 230 facing the first substrate 110 is embedded in the clamping groove 161, and each of the surface of the filter layer 120 facing the second substrate 210 and a surface of the snap-fit structure 160 facing the second substrate 210 is provided with conductive dielectric layer 140. The snap-fit structure includes an organic film, and the conductive dielectric layer may be made of an ITO.

The snap-fit structure 160 according to the present disclosure is provided with the clamping groove 161. In a direction shown in FIG. 1, a top of the plasma isolation structure is embedded in the clamping groove and is attached to the snap-fit structure. The snap-fit structure is attached to the plasma isolation structure, which can increase an overall structural strength of the display, reduce movement of plasma, and reduce deformation of an upper cover plate and a lower cover plate caused by an external force, thereby improving overall pressure resistance.

In an embodiment of the present disclosure, the filter layer 120 includes a plurality of color filters 141 spaced apart, where the color filters 141 include, but are not limited to, (red green blue) RGB three-color filters, and multiple colors are displayed by the color filters. The snap-fit structure connects two adjacent color filters 141, which can reduce an influence on a display effect.

It should be noted that filling medium 130 may be arranged between every two adjacent color filters 141. When the filter layer is arranged on the surface of the first substrate facing the second substrate, the snap-fit structure 160 is arranged on a surface of the filling medium 130, or when the filter layer is arranged on the surface of the first substrate facing away from the second substrate, the snap-fit structure is directly arranged on the surface of the first substrate facing the second substrate. The filling medium 130 is preferably made of a transparent resin. Since the plasma isolation structure 230 surrounds a single pixel by one round, a gap between two adjacent color filters 141 can be filled with the filling medium, such that the filter layer is flat, and the snap-fit structure can be better arranged. The arrangement of the filling medium is a preferred solution.

It should be noted that the snap-fit structure 160 further includes supporting legs, and the supporting legs are arranged on two sides of the clamping groove. The snap-fit structure connects adjacent color filters 141 by means of the supporting legs. One or even more snap-fit structures 160 may be arranged between every two adjacent color filters 141, or snap-fit structures may be arranged only at key positions. Therefore, the specific number and positions of snap-fit structures 160 are not limited herein. For details, reference may be made to FIGS. 2 to 5. In addition, it should be understood that the snap-fit structure is not limited to shape styles in FIGS. 2 to 5, but may be designed and mounted with reference to shape styles in FIGS. 6 to 9, provided that a positional relationship and a connection relationship between the snap-fit structure and the plasma isolation structure are satisfied.

In an embodiment of the present disclosure, supporting structure 330 is arranged in a plasma-filled region. Specifically, the supporting structure 330 includes a supporting microsphere, and the supporting microsphere is tangent to the conductive dielectric layer 140 and the pixel electrode layer 220, respectively. The supporting microsphere mainly achieves a supporting and fixing effect to improve pressure resistance of the display, such that an image will not be blurred or deformed when the display is pressed during display, thereby improving stability of the displayed image.

In an embodiment of the present disclosure, the pixel electrode layer 220 includes a plurality of pixel electrodes distributed in an array, a gap is formed between two adjacent pixel electrodes, and the plasma isolation structure 230 covers the gap. The plasma isolation structure 230 has a trapezoidal structure extending from the pixel electrode layer 220 to the filter layer 120, has a trapezoidal cross-sectional shape, and mainly functions to isolate plasma particles.

Another technical solution of the present disclosure provides a plasma display, including the snap-fit plasma display module according to any of the implementations described above. In a specific implementation of a display device, the display device may be specifically an electronic paper display with microcapsules or microcups, a bistable reflective liquid crystal display, or a liquid crystal display (LCD). For effects of the display device, reference may be specifically made to the effects of the plasma display module described above, which is not described herein.

A process of manufacturing the plasma display module according to the present disclosure specifically includes: first plating a color filter layer on an upper glass substrate to form color blocks with different colors, evaporating a transparent resin layer in a gap between the color filter color blocks to make a surface of the upper substrate flat, and then arranging a plasma isolation structure on a lower substrate assembly; then locating positions of a snap-fit structure and the plasma isolation structure by means of a Mark point positioning technology to ensure that a top of the plasma isolation structure can be embedded in a clamping groove of the snap-fit structure, and then attaching and mounting the snap-fit structure to an upper surface of a plasma barrier weir.

Finally, it should be noted that the above specific implementations are only intended to explain, rather than to limit the technical solutions of the present disclosure. Although the present disclosure is described in detail with reference to the examples, those of ordinary skill in the art should understand that modifications or equivalent substitutions may be made to the technical solutions of the present disclosure without departing from the spirit and scope of the technical solutions of the present disclosure, and such modifications or equivalent substitutions should fall within the scope of the claims of the present disclosure.

What is claimed is:

1. A snap-fit plasma display module, comprising a first substrate and a second substrate, wherein the first substrate and the second substrate are arranged opposite to each other, a plasma display cavity is formed between the first substrate and the second substrate, and the plasma display cavity is filled with plasma particles;

a surface of the first substrate is provided with a filter layer, and a surface of the second substrate facing the first substrate is provided with a pixel electrode layer; and a plasma isolation structure extending toward the first substrate is arranged on the pixel electrode layer, a surface of the filter layer facing the second substrate is provided with a snap-fit structure, a shape of the snap-fit structure is adapted to a shape of the plasma isolation structure to fix the first substrate and the second substrate, and each of the surface of the filter layer facing the second substrate and a surface of the snap-fit structure facing the second substrate is provided with a conductive dielectric layer, wherein an end of the snap-fit structure facing the second substrate is provided with a clamping groove, and an end of the plasma isolation structure facing the first substrate is embedded in the clamping groove, wherein the clamping groove provides a clamping function on the plasma isolation structure to maintain a position of the snap-fit structure with respect to the plasma isolation structure.

2. The snap-fit plasma display module according to claim 1, wherein the filter layer comprises a plurality of color filters spaced apart.

3. The snap-fit plasma display module according to claim 1, wherein a filling medium is arranged between every two adjacent color filters of the plurality of color filters.

4. The snap-fit plasma display module according to claim 3, wherein the filling medium is made of a resin.

5. The snap-fit plasma display module according to claim 1, wherein a supporting structure is arranged in the plasma display cavity.

6. The snap-fit plasma display module according to claim 4, wherein the supporting structure comprises a supporting microsphere, and the supporting microsphere is tangent to the conductive dielectric layer and the pixel electrode layer, respectively.

7. The snap-fit plasma display module according to claim 1, wherein the pixel electrode layer comprises a plurality of pixel electrodes distributed in an array, a gap is formed between two adjacent pixel electrodes of the plurality of pixel electrodes, and the plasma isolation structure is arranged at the gap.

8. The snap-fit plasma display module according to claim 1, wherein a cross-sectional shape of the plasma isolation structure comprises a trapezoid.

9. A plasma display, wherein plasma of the plasma display is composed of pigment particles, the plasma display comprising the snap-fit plasma display module according to claim 1.

10. The plasma display according to claim 9, wherein in the snap-fit plasma display module, the filter layer comprises a plurality of color filters spaced apart.

11. The plasma display according to claim 9, wherein in the snap-fit plasma display module, a filling medium is arranged between every two adjacent color filters of the plurality of color filters.

12. The plasma display according to claim 11, wherein in the snap-fit plasma display module, the filling medium is made of a resin.

13. The plasma display according to claim 9, wherein in the snap-fit plasma display module, a supporting structure is arranged in the plasma display cavity.

14. The plasma display according to claim 12, wherein in the snap-fit plasma display module, the supporting structure comprises a supporting microsphere, and the supporting microsphere is tangent to the conductive dielectric layer and the pixel electrode layer, respectively.

15. The plasma display according to claim 9, wherein in the snap-fit plasma display module, the pixel electrode layer comprises a plurality of pixel electrodes distributed in an array, a gap is formed between two adjacent pixel electrodes of the plurality of pixel electrodes, and the plasma isolation structure is arranged at the gap.

16. The plasma display according to claim 9, wherein in the snap-fit plasma display module, a cross-sectional shape of the plasma isolation structure comprises a trapezoid.

* * * * *